(12) United States Patent
Debalme et al.

(10) Patent No.: US 6,746,737 B2
(45) Date of Patent: Jun. 8, 2004

(54) HOLLOW COMPOSITE BODY AND ITS MANUFACTURING PROCESS

(75) Inventors: Jean-Paul Debalme, Chambery (FR); Gilles Rocher, Chambery (FR)

(73) Assignee: Saint-Gobain Vetrotex France, Chambery (FR)

( * ) Notice: Subject to any disclaimer, the term of this patent is extended or adjusted under 35 U.S.C. 154(b) by 0 days.

(21) Appl. No.: 09/887,256

(22) Filed: Jun. 25, 2001

(65) Prior Publication Data

US 2002/0012765 A1 Jan. 31, 2002

(30) Foreign Application Priority Data

Jul. 20, 2000 (FR) ............................................. 00 09640

(51) Int. Cl.[7] .......................... B29D 22/00; B29D 23/00; B32B 1/08
(52) U.S. Cl. ..................... 428/34.6; 428/34.1; 428/35.7; 428/36.3; 428/36.4; 428/36.9; 428/36.91; 428/34.7
(58) Field of Search ............................... 428/34.1, 35.7, 428/36.3, 36.4, 36.9, 36.91, 34.5, 34.6, 34.7

(56) References Cited

U.S. PATENT DOCUMENTS 5,437,899 A * 8/1995 Quigley .................... 428/35.7
6,335,101 B1 * 1/2002 Haeger et al. ............. 428/475.2

FOREIGN PATENT DOCUMENTS

| WO | 00/15415 | 3/2000 |
| WO | 00/15418 | 3/2000 |

* cited by examiner

*Primary Examiner*—Harold Pyon
*Assistant Examiner*—Patricia L. Nordmeyer
(74) *Attorney, Agent, or Firm*—Oblon, Spivak, McClelland, Maier & Neustadt, P.C.

(57) ABSTRACT

A hollow composite body includes a thermoplastic internal layer as a liner, a thermoplastic interlayer with embedded reinforcing fibers, and a thermoplastic external layer. The hollow body is made by furnishing the liner as a preform; introducing the preform into a mold, an inflatable bladder having been inserted into the preform; heating the preform and inflating the bladder to apply pressure against the internal wall of the preform. A space between the external wall of the preform and the internal wall of the mold is tailored to the thickness of the external layer of the hollow body to be obtained, so as to allow migration of the thermoplastic of the interlayer, and possible of the liner, beyond the interlayer.

11 Claims, 2 Drawing Sheets

HOLLOW COMPOSITE BODY AND ITS MANUFACTURING PROCESS

INCORPORATION BY REFERENCE

The present application is based on French patent application 0009640, filed on Jul. 20, 2000, which is hereby incorporated by reference in its entirety.

BACKGROUND OF THE INVENTION

Field of the Invention

The invention relates to a hollow composite body and its manufacturing process, the hollow body consisting of an internal layer of thermoplastic, a composite interlayer made of a thermoplastic in which reinforcing fibers are embedded, and an external layer made of a thermoplastic.

Cylindrical hollow bodies of this type, intended to contain pressurized fluids for example, are known from Patent Application WO 00/24566. Melting of the internal layer with the interlayer is obtained by a manufacturing process in which a thermoplastic tape having embedded continuous glass fibers is wound around a primary structure, or "liner" (which term will be employed in the rest of the description). This is done by heating the surface of the liner which is to be covered with the tape, in a zone located immediately adjacent the zone where the tape comes into contact with the liner, to a temperature above the melting point of the thermoplastic, then applying local pressure to the surface of the liner already covered with the tape in a zone located immediately adjacent the heating zone. This process makes it possible to completely fuse the thermoplastic of the liner and that of the composite tape and to remove the air between the layers of tape covering the liner. Finally, in order to coat the cylindrical body thus obtained with the external protective thermoplastic finishing layer, the process continues with a coextrusion step.

This process proves to be particularly advantageous in the case of elongate hollow bodies of cylindrical shape but is much more difficult, or sometimes impossible, to use for more complex shapes, especially when coextruding the external thermoplastic layer.

Patent Application WO 00/15415 proposes the manufacture of a composite pressurized tank of non-cylindrical shape by covering a thermoplastic liner with a layer of a glass fiber based composite by filament winding, placing this semifinished product or preform (this latter term being employed hereafter) in a mold, having beforehand introduced an inflatable bag thereinto, and in raising the temperature of the assembly while applying pressure in the liner by inflating the bag. This makes it possible to consolidate the composite layer with the liner.

For a tank of this type, requiring an external functional thermoplastic covering around the composite layer, a preform composed of the liner and the composite layer is surrounded with a thermoplastic film before it is inserted into the mould. The three constituents, namely the liner, the composite layer and the film, are then consolidated by heating the mold and inflating the bag.

This technique for producing the external layer of a complex shape therefore requires the product to be surrounded with a thermoplastic film. However, this operation can prove to be difficult and lengthy to implement when the complex structure has contours of variable shapes, the operator having to take particular care to suitably coat the details of its contours. The cost of such a solution is also to be taken into consideration since the use of such a thermoplastic film and the time spent in applying it consequently increase the manufacturing cost of the product.

SUMMARY OF THE INVENTION

It is therefore an object of the invention to manufacture a hollow composite body comprising an external covering layer made of a thermoplastic in a simpler and less expensive manner.

According to the invention, a hollow body includes an external layer formed from the thermoplastic of the interlayer and possibly of the internal layer, which thermoplastic has migrated beyond the interlayer during manufacture of the hollow body. This hollow body thus constitutes a homogeneous product since the continuity of the thermoplastic of the liner up to the external layer ensures perfect consolidation of the components. This is not necessarily guaranteed when the constituent layers are, as in the prior art, added successively one after the other and then consolidated.

Furthermore, this solution proves to be quicker to implement than that of the prior art by dispensing with one step in the process, since it is not necessary to apply a thermoplastic film.

According to one characteristic of the invention, the hollow body, before migration, comprises the liner and the composite interlayer covering the said liner, the migration of the thermoplastic taking place after pressurization of the internal wall of the liner and heating of the liner covered with the interlayer.

Surprisingly, the present inventors have found that the material of the interlayer migrates beyond the interlayer during its consolidation with the liner, and that the means employed for the consolidation can be tailored in order to also make the thermoplastic of the liner migrate, so as to increase the thickness of the external layer.

Advantageously, the thermoplastic of the composite interlayer is identical to that of the internal layer. Preferably, the thermoplastic is a polyolefin, for example polypropylene or polyethylene, or else a thermoplastic polyester such as polyethylene terephthalate (PET) or polybutylene terephthalate (PBT), and the reinforcing fibers are glass fibers.

The process for manufacturing this hollow composite body comprises the following steps: furnishing the external surface of the liner with a composite so as to constitute a preform, the composite consisting of a thermoplastic mixed with reinforcing fibers; introducing the preform into a mold, an inflatable bladder having been inserted into the preform; and heating the preform and inflating the inside of the bladder in order to apply pressure against the internal wall of the preform, wherein a space between the external wall of the preform and the internal wall of the mold is tailored to the thickness of the external layer of the hollow body to be obtained, so as to allow migration of the thermoplastic of the interlayer, and possibly of the liner, beyond the interlayer during the heating and pressure application step.

According to one further characteristic of the invention, the composite is deposited by winding a tape which is delivered by an applicator from a multiplicity of wound packages of composite yarn advantageously consisting of co-mingled glass and thermoplastic filaments.

According to another further characteristic of the invention, the pressure applied to the inside of the bladder is between 1 and 10 bar, while the temperature to which the preform is heated is at least equal to the highest melting point of the thermoplastics present in the preform.

BRIEF DESCRIPTION OF THE DRAWINGS

Further characteristics and advantages of the invention will become apparent on reading the description which follows, with regard to the appended drawings in which:

FIG. 3 is a cross-sectional view of a mold before the final hollow body is obtained, in which mold the preform consisting of the composite-coated liner is placed.

DETAILED DESCRIPTION OF THE PREFERRED EMBODIMENT

Figure 1:
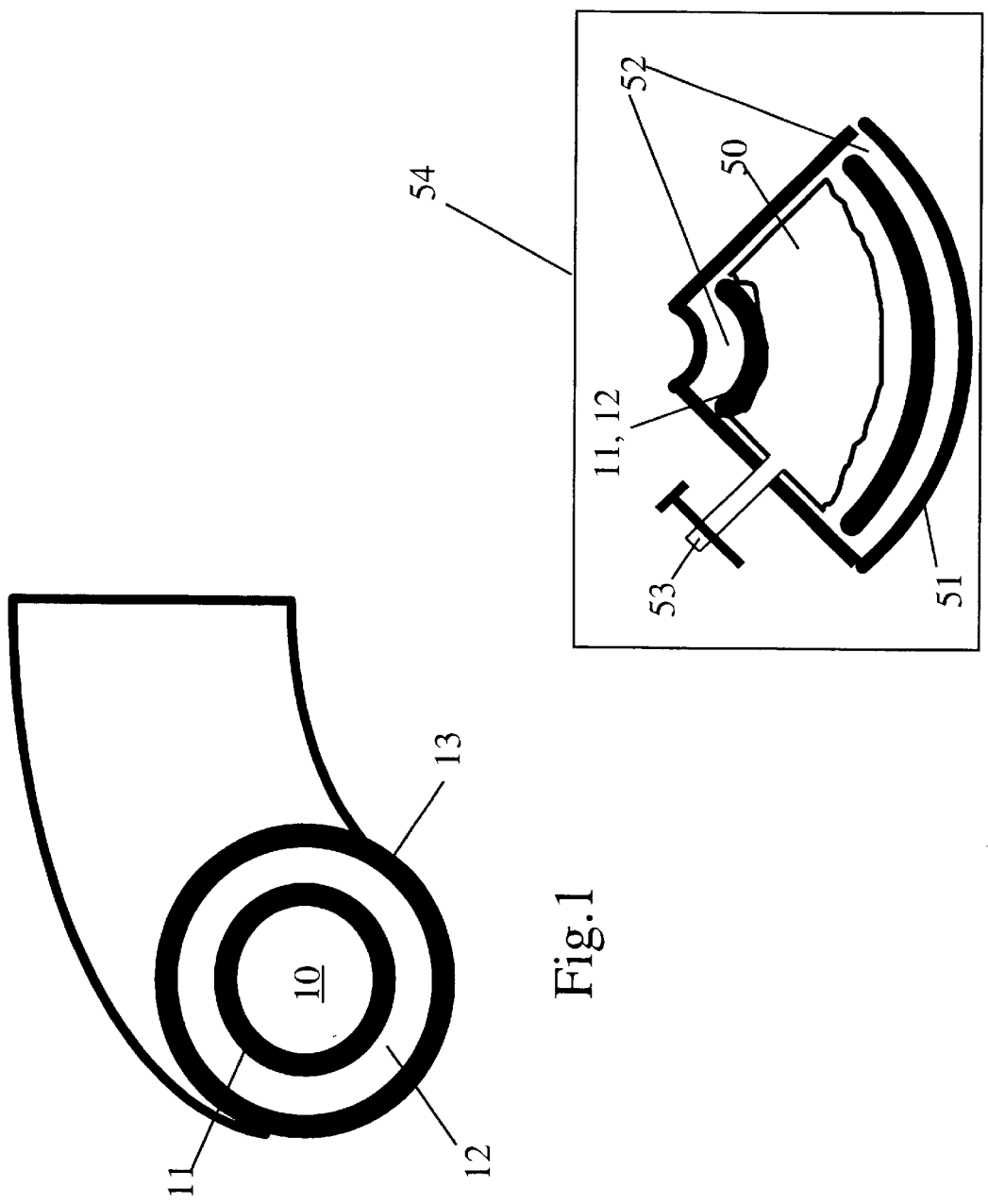
FIG. 1 is a perspective view of a hollow body according to the invention.

FIG. 1 is a perspective view of a hollow composite body 1 of complex shape, having at least one opening 10. The shape is called complex in the sense that its surface may have concave and/or convex parts. The hollow body illustrated here is a bend which may, for example, be joined to two pipes intended to convey pressurized fluids.

The three constituent layers of the hollow body 1 can be seen in cross section, namely the internal layer 11, the composite interlayer 12 and the external layer 13.

The internal layer 11 constitutes the "liner" of the hollow body; it is made of a thermoplastic and produced by any known process of the extrusion or injection or moulding type.

This internal layer is covered by the filament winding of the interlayer 12, which is based on a thermoplastic and reinforcing fibers such as glass fibers. The composite of the interlayer 12 at the time it is deposited on the liner is in the form of a tape which is wound around the liner. As will be explained later, the thermoplastic of the interlayer is not necessarily identical to that of the liner but is compatible with it in order to allow them to be unified in the subsequent consolidation step.

Finally, the external layer 13, which is a covering for protecting the interlayer 12, is made of a thermoplastic identical to that of the interlayer 12 and possibly of the internal layer 11. There is no need for the addition of material around the interlayer since of the material of the interlayer and possibly of the internal layer migrates beyond the interlayer during the step of consolidating the liner and the windings of the tape.

Figure 2:
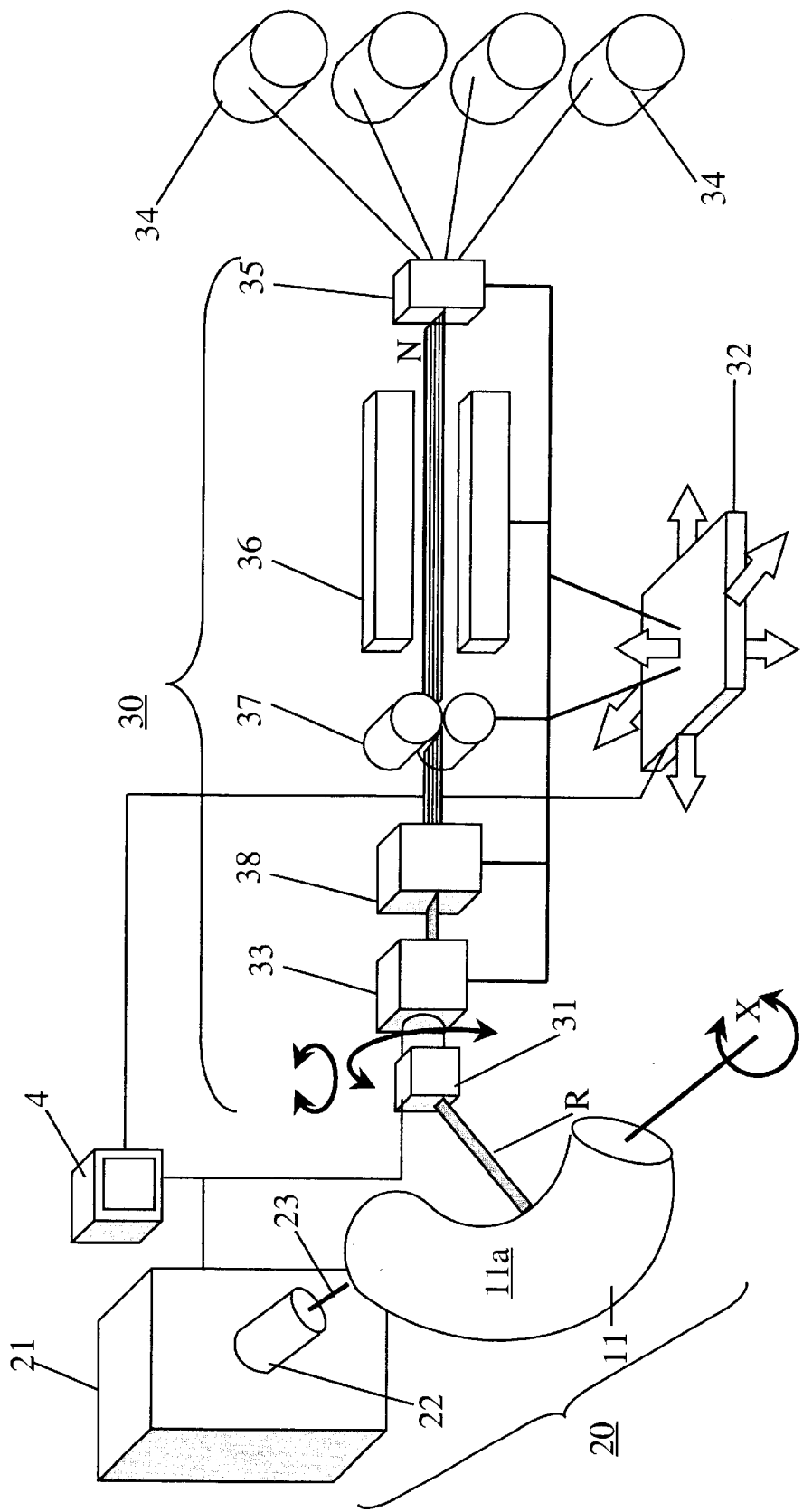
FIG. 2 is a schematic perspective view of the apparatus for implementing the composite tape by filament winding around the liner constituting the internal layer of the hollow body.

The process for manufacturing the hollow body will now be described with regard to FIGS. 2 and 3 illustrating the apparatus employed. It comprises two steps, the first for producing a preform, which is the liner coated with the unconsolidated interlayer 12, and the second making it possible to obtain the consolidated finished product provided with the external layer 13.

The first step comprises the application of the composite to the entire external surface 11a of the liner 11. For this purpose, the apparatus employed, shown in FIG. 2, comprises a system 20 for supporting the liner and an assembly 30 for delivering the composite to be deposited on the liner.

The support system 20 comprises a stand 21 on which a shaft 22 is mounted, the shaft rotating about an axis X and intended to rotate the liner 11. The free end 23 of the shaft is able to cooperate with, by fitting, screwing or any other relevant means, either a mandrel (not illustrated) about which the liner is wrapped when the latter has a symmetry of revolution, or the liner's opening 10 as illustrated in FIG. 2.

The delivering assembly 30 consists of an applicator 31 and of various components explained in the rest of the description, these being advantageously fixed to a common bed 32.

The applicator 31 is located at one end of a support mechanism 33 and may be driven with respect to the surface of the liner 11 in translational movements in a direction parallel to the axis of rotation, X and in two directions perpendicular to the said axis, and pivoting movements about axes perpendicular to the axis X.

The applicator 31 delivers the composite in the heated state in the form of a tape R which is deposited on the external surface 11a of the rotating liner, the applicator being constantly held as close as possible to this surface and following this surface along a path defined by the combination of the rotational movements of the liner about the axis X and the translational and/or pivoting movements of the applicator 31. The rotational, translational and pivoting movements are controlled by numerical controller 4 managed, for example, by a computer which may be equipped with a software package designed for filament winding and using the mathematically modelled geodesic paths of the liner. The controller 4 also controls the rotation of the shaft 22 supporting the liner.

The composite tape R delivered by the applicator 31 is produced by a process implemented by a manufacturing apparatus, both the process and the apparatus being described in French Patent Application FR 99/13067, which is hereby incorporated by reference.

The tape, having a width of 15 mm for example, is advantageously produced in line, that is to say directly from the wound yarn packages 34 of composite material which are unwound concomitantly, independently of one another. Each yarn preferably consists of co-mingled glass and thermoplastic filaments. This type of yarn is sold by Vetxotex under the brand name TWINTEX®.

A separate pay-out (unwinding) per wound package allows relative mobility of the filaments and permits pay-out speed differentials between packages, these being necessary to compensate for the variations in distance between each of the paths of the filaments from the wound packages to the point of application of the tape. Thus, a change in orientation of the tape with respect to the pay-out direction of the filaments does not cause any tensioning of the filaments which are furthest away from the center of the radius of the curvature of the path of the tape.

This configuration guarantees that a perfectly flat tape with no width variation is obtained, by preventing any overlap of the filaments or twisting of the tape.

Mounted on the bed 32 are, apart from the wound packages 34, the various components allowing the tape to be manufactured. The imposed tension in the tape at the moment it is applied to the liner is provided by passage of the filaments through the manufacturing components.

The filaments are brought together so as to be parallel, by means of a comb 35, into the form of a sheet N which enters a zone 36 where it is heated to a temperature reaching at least the melting point of the thermoplastic without reaching the softening temperature of the reinforcing fibers. Next, the sheet N is made to run through a rotating impregnation device 37, while keeping the thermoplastic hot and malleable in order to distribute it uniformly and guarantee complete impregnation of the reinforcing fibers with the thermoplastic. Next, the sheet N passes through a shaping and centering device 38 while maintaining its temperature at a level sufficient to maintain the thermoplastic in the malleable state, so as to obtain a tape R formed by bringing the yarns close together, thus creating transverse continuity. Finally, the tape is conveyed to the applicator 31 which includes internal heating means for maintaining the malleability of the thermoplastic of the tape.

The mechanism 33 for supporting the applicator 31 is placed on the common bed 32, which is able to move and is controlled by the controller 4. The translational movements of the applicator 31 are thus generated by the movement of the bed which consequently drives, in an identical movement, all of the components for manufacturing the tape. The path travelled by the tape from the shaping device 38 to the applicator 31 may thus be optimized in order to keep the tape at the correct temperature.

The tape R starts to be wound around the liner 11 when the tape, which runs through its manufacturing components, has reached the temperature suitable for its deposition, the initiation of the winding beyond the liner possibly being carried out by any suitable means available to those skilled in the art. For example, it is possible to use the rotary shaft 22 by fixing thereto, by adhesive means, the end of the tape; the winding starts around the shaft 22 and continues onto the liner at the desired moment.

The applicator 31 is controlled so that the tape perfectly matches the contours of the external surface of the liner. The winding angle, given by the orientation of the applicator 31 with respect to the surface of the liner, and the number of layers deposited are determined according to the desired mechanical performance of the final product and consequently according to the axial or radial stresses to which the hollow body will be subjected.

After the tape has been wound around the liner, the tape is cut, manually or by automated means, and the composite preform is stripped of the tape parts that serve to start the winding.

The composite preform, which consists of the liner 11 wound with the composite tape, is then removed from the rotary shaft. An inflatable bladder 50 is inserted into the preform, the bladder being automatically centered as soon as it is pressurized.

The preform is then placed in a mold 51 made of a thermally conducting material, such as aluminium. The mold is machined such that the contours of its internal wall reproduce the external shape of the final product desired. The internal dimensions of the mold are designed to allow for a space 52 to be left between the liner covered with the composite and the internal wall of the mold. After the mold has been closed, air is injected into the bladder 50 through its inflation valve 53 at a pressure of between 1 and 10 bar until the bladder occupies the total internal volume of the preform.

The mold 51 is then placed in an oven 54, the temperature of which reaches at least the highest melting point of the thermoplastics present in the preform. The duration of the oven treatment depends on several parameters, especially the type of thermoplastic of the layers 11 and 12, the desired thickness of the external layer 13 to be obtained by migration of the thermoplastic of the layer 12, and possibly of the layer 11, and the type of material chosen for the mold.

It goes without saying that the preform may be heated in another manner, the mold possibly being a heated mold, or else a resistance heating element may be incorporated into the bladder. In addition, the heating may be simultaneous with or prior to pressurization of the bladder.

The heat applied to the mold is transmitted both to the composite layer 12 and the liner 11, and it softens the thermoplastic of the composite and possibly of the liner, so that the thermoplastic can flow. Owing to the effect of the pressure applied to the bladder, the thermoplastic migrates towards the wall of the mold beyond the composite layer, expelling and replacing the air remaining between the windings of the tape in order to fill the entire space 52, the migration being stopped by the internal wall of the mold. Of course, the mold is not completely airtight so as to allow the air expelled from the preform to escape. The width of the space 52 is designed according to the thickness of the desired external layer 13.

The mold is then left to cool. After the structure has been consolidated, the air is removed from the bladder, the mold is opened and the consolidated finished product is removed from the mold.

What is claimed is:

1. A hollow composite body comprising:
   an internal layer formed from a thermoplastic, which internal layer forms a liner of said composite body;
   a composite interlayer formed from a thermoplastic in which reinforcing fibers are embedded; and
   an external layer formed from a thermoplastic,
   wherein the external layer is composed of the thermoplastic of at least the interlayer, which thermoplastic has migrated beyond the interlayer during manufacture of the hollow body.

2. The hollow composite body according to claim 1, wherein the thermoplastic is a polyolefin.

3. The hollow composite body according to claim 1, wherein the thermoplastic is a polyester.

4. The hollow composite body according to claim 1, wherein the reinforcing fibers are glass fibers.

5. The hollow composite body according to claim 1, wherein the external layer is further composed of the thermoplastic of the internal layer, which thermoplastic of the internal layer has migrated beyond the interlayer during manufacture of the hollow body.

6. A process for manufacturing a hollow composite body of claim 1 comprising the steps of:
   furnishing the external surface of the liner with a composite so as to produce a preform, the composite comprising a thermoplastic mixed with reinforcing fibers;
   introducing an inflatable bladder into the preform;
   introducing the preform and bladder into a mold; and
   heating the preform and inflating the inside of the bladder in order to apply pressure against the internal wall of the preform,
   wherein a space is provided between the external wall of the preform and the internal wall of the mold, a size of the space being tailored to the thickness of the external layer of the hollow body to be obtained, so as to allow migration of the thermoplastic of at least the interlayer beyond the interlayer during the heating and pressure application step.

7. The process according to claim 6, wherein the furnishing step comprises the steps of obtaining a tape from a multiplicity of wound packages of composite yarn, and depositing the composite on the external surface of the liner by using an applicator to wind the tape thereon.

8. The process according to claim 7, wherein the composite yarn is comprised of co-mingled glass and thermoplastic filaments.

9. The process according to claim 6, wherein the pressure used to inflate the bladder is between 1 and 10 bar.

10. The process according to claim 6, wherein a temperature to which the preform is heated in the heating step is at least equal to the highest one of the melting points of the thermoplastics present in the preform.

11. The process according to claim 6, wherein the migration of the thermoplastic during the heating and pressure application step includes a migration of the thermoplastic of the internal layer.

* * * * *